(12) United States Patent
Zhang et al.

(10) Patent No.: US 11,768,412 B2
(45) Date of Patent: Sep. 26, 2023

(54) DISPLAY SUBSTRATE, DISPLAY PANEL AND DISPLAY DEVICE

(71) Applicants: HEFEI BOE DISPLAY TECHNOLOGY CO., LTD., Anhui (CN); BOE TECHNOLOGY GROUP CO., LTD., Beijing (CN)

(72) Inventors: Chunxu Zhang, Beijing (CN); Ke Dai, Beijing (CN); Haipeng Yang, Beijing (CN); Yuntian Zhang, Beijing (CN); Xiaoting Jiang, Beijing (CN); Min Cheng, Beijing (CN)

(73) Assignees: HEFEI BOE DISPLAY TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 229 days.

(21) Appl. No.: 17/299,678

(22) PCT Filed: Sep. 17, 2020

(86) PCT No.: PCT/CN2020/115949
§ 371 (c)(1),
(2) Date: Jun. 3, 2021

(87) PCT Pub. No.: WO2022/056782
PCT Pub. Date: Mar. 24, 2022

(65) Prior Publication Data
US 2022/0308412 A1    Sep. 29, 2022

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01)

(58) Field of Classification Search
CPC .................................................. G02F 1/1362
See application file for complete search history.

(56) References Cited

U.S. PATENT DOCUMENTS

2006/0215086 A1* 9/2006 Kurasawa ......... G02F 1/133555
349/114
2016/0377945 A1* 12/2016 Cai .................... G02F 1/136286
257/72
2017/0146876 A1* 5/2017 Ming .................... G02F 1/1368

FOREIGN PATENT DOCUMENTS

CN          106125436 A     11/2016
CN          109188813  *     1/2019  ........... G02F 1/1343

(Continued)

*Primary Examiner* — Sang V Nguyen
(74) *Attorney, Agent, or Firm* — Nath, Goldberg & Meyer; Joshua B. Goldberg

(57) ABSTRACT

There is provided a display substrate, including gate lines and data lines, which define pixel units, each pixel unit includes a pixel electrode, at least some pixel units are provided with a conductive bridge line in a same layer as the pixel electrode; in the pixel unit with the conductive bridge line, a first hollow structure is on a first side of a first or second end part of the pixel electrode, an end of the conductive bridge line is in the first hollow structure, a second hollow structure is on a second side of the first end part, an absolute value of a difference between parasitic capacitances respectively formed between the pixel electrode and the data lines on two sides of the pixel electrode and closest thereto is less than or equal to a preset capacitance difference value. A display panel and a display device are further provided.

12 Claims, 7 Drawing Sheets

(56) References Cited

FOREIGN PATENT DOCUMENTS

| CN | 111176042 A | 5/2020 |
|---|---|---|
| CN | 111443542 A | 7/2020 |
| JP | 2008151880 A | 7/2008 |
| JP | 2009151098 A | 7/2009 |

* cited by examiner

DISPLAY SUBSTRATE, DISPLAY PANEL AND DISPLAY DEVICE

This is a National Phase Application filed under 35 U.S.C. 371 as a national stage of PCT/CN2020/115949, filed Sep. 17, 2020, the content of which is hereby incorporated by reference in its entirety.

TECHNICAL FIELD

The present disclosure relates to the field of display, and in particular, to a display substrate, a display panel, and a display device.

BACKGROUND

The Advanced super-Dimension Switch (ADS) display mode has advantages of a wide viewing angle, a high response speed, a high transmittance and the like, and thus becomes a popular display mode, and is used in product design by many panel manufacturers. However, in practical applications, an image displayed by a conventional ADS type display device has obvious mura.

SUMMARY

The present disclosure is directed to at least one of technical problems in the related art, and provides a display substrate, a display panel and a display device.

In a first aspect, an embodiment of the present disclosure provides a display substrate, including: a first base substrate, and a plurality of gate lines and a plurality of data lines which are disposed on the first base substrate, where the gate lines extend along a first direction, the data lines extend along a second direction, and the first direction and the second direction are crossed and are parallel to a plane where the first base substrate is positioned;

the plurality of gate lines and the plurality of data lines define a plurality of pixel units, and each of the pixel units includes a thin film transistor, a pixel electrode and a common electrode, where the pixel electrode is positioned on a side of the common electrode away from the first base substrate, an area where the pixel electrode is positioned and an area where the thin film transistor is positioned in a same one of the pixel units are arranged along a second direction, an end, proximal to the thin film transistor, of the pixel electrode is a first end part, an end, away from the thin film transistor, of the pixel electrode is a second end part, at least a portion of the pixel units are provided with a conductive bridge line, and the conductive bridge line and the pixel electrode are arranged in a same layer;

in the pixel unit configured with the conductive bridge line, a first hollow structure is arranged on a first side of the first end part or the second end part of the pixel electrode, an end of the conductive bridge line is located in the first hollow structure and is coupled to the common electrode through a via hole, and a second hollow structure is arranged on a second side of the first end part of the pixel electrode, so that an absolute value of a difference between lateral capacitances respectively formed by the pixel electrode and data lines located on two sides of the pixel electrode and closest to the pixel electrode is less than or equal to a preset capacitance difference value;

the first side and the second side are opposite sides of the pixel electrode in a first direction.

In some implementations, the second hollow structure and the first hollow structure have a same length in the second direction.

In some implementations, in the pixel unit configured with the conductive bridge line, a third hollow structure is disposed at a second side of the second end part of the pixel electrode, and the second hollow structure and the third hollow structure are configured such that an absolute value of a difference between lateral capacitances respectively formed by the pixel electrode and the data lines located at two sides of the pixel electrode and closest to the pixel electrode is less than or equal to the preset capacitance difference value.

In some implementations, a sum of lengths of the second hollow structure and the third hollow structure in the second direction is equal to a length of the first hollow structure in the second direction.

In some implementations, a length of the third hollow structure in the first direction is less than or equal to a length of the first hollow structure in the first direction.

In some implementations, a length of the second hollow structure in the first direction is less than or equal to a length of the first hollow structure in the first direction.

In some implementations, the lateral capacitances respectively formed by the pixel electrode and the data lines located on two sides of the pixel electrode and closest to the pixel electrode are equal to each other.

In some implementations, in the pixel unit configured with the conductive bridge line, the pixel electrode has a first orthographic projection on the first base substrate, the data lines located at two sides of the pixel electrode and closest to the pixel electrode have a second orthographic projection on the first base substrate, and a spacing area is formed between the first orthographic projection and the second orthographic projection; and in the pixel unit configured with the conductive bridge line, the common electrode is a block-shaped common electrode, and an orthographic projection of an edge of the block-shaped common electrode proximal to the data line on the first base substrate is positioned in the spacing area.

In some implementations, the display substrate further includes common electrode lines which are arranged in the same layer as the gate lines;

the pixel units arranged along the first direction correspond to a same one of the common electrode lines, the common electrode in each of the pixel units is electrically coupled to a corresponding one of the common electrode lines, and an orthographic projection of the second end part of the pixel electrode in each of the pixel units on the first base substrate is overlapped with an orthographic projection of the corresponding one of the common electrode lines on the first base substrate.

In some implementations, a drain electrode of the thin film transistor is coupled to the pixel electrode through a via hole;

in response to that the first hollow structure is located on the first side of the first end part of the pixel electrode, the via hole for coupling the drain electrode to the pixel electrode is located between the first hollow structure and the second hollow structure.

In a second aspect, an embodiment of the present disclosure further provides a display panel, including: the display substrate provided in the first aspect and an opposite substrate, which are arranged oppositely, where a liquid crystal layer is filled between the display substrate and the opposite substrate.

In a third aspect, an embodiment of the present disclosure further provides a display device, including: the display panel provided in the second aspect and a light source.

DESCRIPTION OF DRAWINGS

FIG. 7 is a schematic cross-sectional view taken along line A-A' of FIG. 6a;

DESCRIPTION OF EMBODIMENTS

In order to make those skilled in the art better understand technical solutions of the present disclosure, a display substrate, a display panel and a display device according to the present disclosure are described in detail below with reference to the accompanying drawings.

In order to solve a problem that an image displayed by a display device in the related art has obvious mura, the reason of generating the mura in the related art is analyzed in the present disclosure and a corresponding technical solution is provided.

In a liquid crystal display device, in order to avoid a problem of liquid crystal fatigue caused by liquid crystal molecules always deflecting in a certain direction, a polarity inversion method is adopted to drive the liquid crystal display device in a display driving process, and common polarity inversion methods includes: horizontal inversion, column inversion, and dot inversion.

In an ADS type display device, since a distance between a pixel electrode and data lines on two sides of the pixel electrode is relative short (generally, ranging from 3 μm to 5 μm), a lateral capacitance (also referred to as fringe capacitance) is formed between the pixel electrode and the data lines on two sides of the pixel electrode and closest to the pixel electrode. When a polarity of a data voltage loaded in the data line is inverted, the data voltage in the data line jumps greatly, and a voltage loaded on the pixel electrode changes due to lateral capacitive coupling between the data line and the pixel electrode. In order to reduce an influence of polarity inversion of the data voltage in the data line on the voltage loaded on the pixel electrode as much as possible, polarities of data voltages in two adjacent data lines of the display panel are usually set to be opposite. In such case, for any pixel unit, when the polarity of the data voltage in any of the data lines located at two sides of the pixel unit and closest to the pixel electrode is inverted, the data voltage in one data line jumps from positive polarity to negative polarity (the lateral capacitance between the data line and the pixel electrode pulls down the voltage loaded on the pixel electrode), and the data voltage in the other data line jumps from negative polarity to positive polarity (the lateral capacitance between the data line and the pixel electrode pulls up the voltage loaded on the pixel electrode), so as to balance the influence of the polarity inversion of the data voltages in the data lines on the voltage loaded on the pixel electrode.

Figure 1:
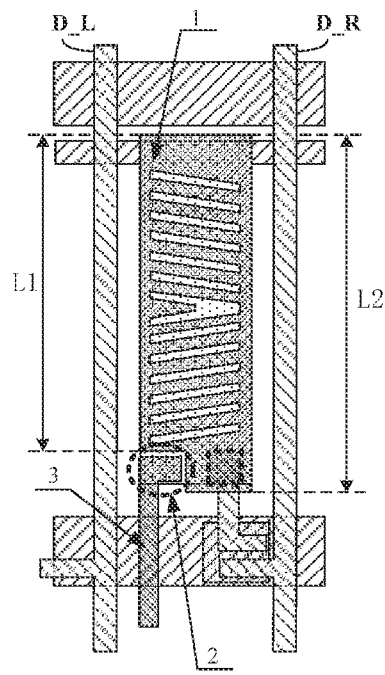
FIG. 1 is a top view of a pixel unit configured with a conductive bridge line according to the related art.
Figure 2:
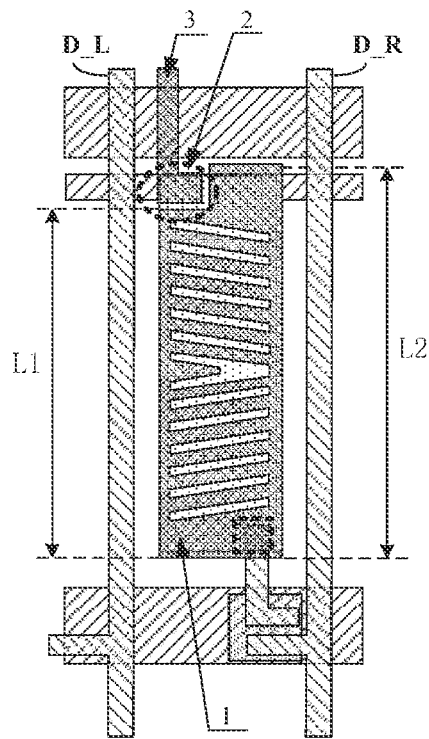
FIG. 2 is another top view of a pixel unit configured with a conductive bridge line according to the related art.

FIG. 1 is a top view of a pixel unit configured with a conductive bridge line according to the related art, and FIG. 2 is another top view of a pixel unit configured with a conductive bridge line according to the related art, as shown in FIG. 1 and FIG. 2, generally, a pixel electrode 1 in a pixel unit is in a shape of a parallelogram (e.g., a rectangle); however, in an ADS type display panel, some pixel units need to be configured to accommodate a conductive bridge line 3 (which would be electrically coupled to a common electrode through a via hole), and the conductive bridge line 3 and the pixel electrode 1 are disposed in a same layer; since the conductive bridge line 3 will occupy a portion of area of the pixel electrode 1, a hollow structure 2 is required to be disposed in the pixel electrode 1 to accommodate an end of the conductive bridge line 3. FIG. 1 exemplarily shows a case where the hollow structure 2 for accommodating the end of the conductive bridge line 3 is located at a lower left corner of the pixel electrode 1, and FIG. 2 exemplarily shows a case where the hollow structure 2 for accommodating the end of the conductive bridge line 3 is located at an upper left corner of the pixel electrode 1.

With continued reference to FIG. 1 and FIG. 2, a length of a first portion of the pixel electrode 1 capable of generating a lateral capacitance with the data line D_L on a left side is L1, a length of a second portion of the pixel electrode 1 capable of generating a lateral capacitance with the data line D_R on a right side is L2, in such case, the lateral capacitance between the first portion of the pixel electrode 1 and the data line D_L on the left side is Cpd_L, and the lateral capacitance between the second portion of the pixel electrode 1 and the data line D_R is Cpd_R, since L1<L2, and thus Cpd_L<Cpd_R, a difference between Cpd_L and Cpd_R is denoted by ΔCpd, and ΔCpd=|Cpd_L−Cpd_R|. Through actual measurements, it is found that L2−L1>20 micrometers (μm), ΔCpd=|Cpd_L−Cpd_R|>1.2 femtofarads (fF). Since a value of ΔCpd is relatively large, even if the data voltages in the data lines on the left and right sides are simultaneously reversed in different polarities, the voltage loaded on the pixel electrode 1 is greatly changed, a luminance change of the pixel unit is larger than two gray scales, and a luminance abnormality which can be obviously sensed by a user can be caused.

Figure 3:
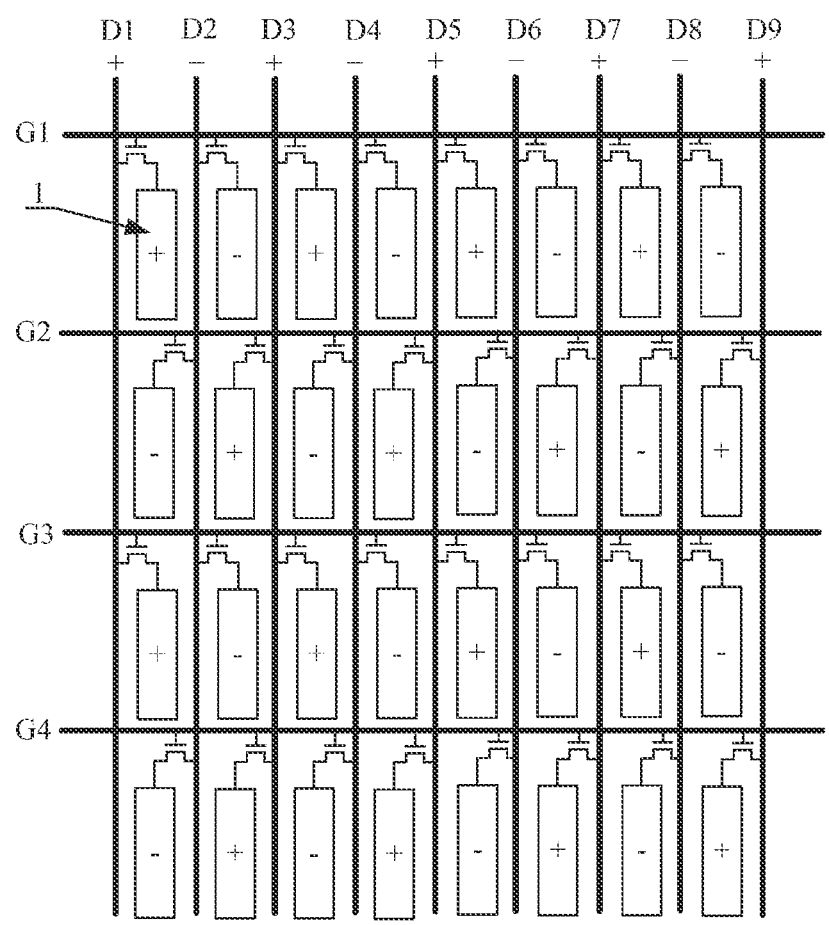
FIG. 3 is a schematic circuit diagram illustrating a pixel unit in a Z-inversion arrangement according to the present disclosure.

FIG. 3 is a schematic circuit diagram illustrating a circuit structure of pixel units in a Z-inversion arrangement in the present disclosure, and as shown in FIG. 3, a case where the pixel units in the display substrate are arranged in a Z-inversion arrangement is taken as an example; specifically, the pixel units in the $i^{th}$ row are coupled to the $i^{th}$ gate line G1, G2, G3 or G4, the pixel units in odd-numbered rows are respectively coupled to the data lines on a first side (left side of the pixel units in the drawing) of the pixel units and closest to the pixel units, and the pixel units in even-numbered rows are respectively coupled to the data lines on a second side (right side of the pixel units in the drawing) of the pixel units and closest to the pixel units. When pixels are driven, a column inversion mode is adopted, that is, polarities of data voltages loaded in adjacent data lines are opposite, so that the display panel can achieve an effect of dot inversion. FIG. 3 shows an example in which the data voltages applied to the data lines D1, D3, D5, D7 and D9 in odd-numbered columns have a positive polarity (+), and the data voltages applied to the data lines D2, D4, D6 and D8 in even-numbered columns have negative polarity (−).

Figure 4:
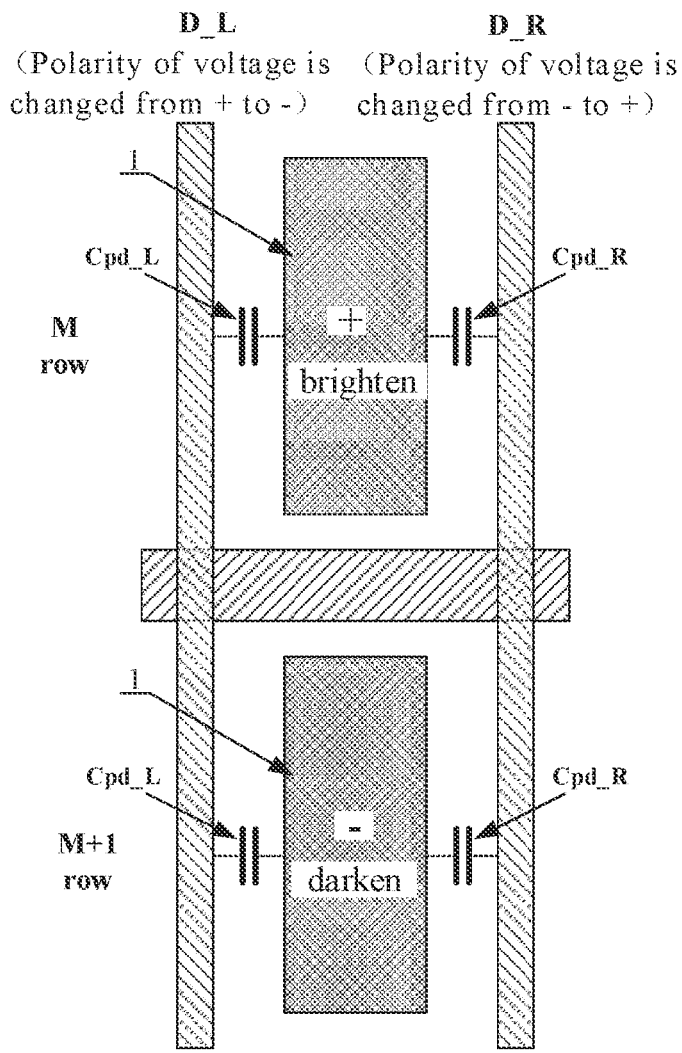
FIG. 4 is a schematic circuit diagram of two pixel units in a same column and adjacent rows of FIG. 3.

FIG. 4 is a schematic circuit diagram of two pixel units in a same column and adjacent rows in FIG. 3, and as shown in FIG. 4, the voltage applied to the pixel electrode 1 in the pixel unit in the M row has a positive polarity, the voltage applied to the pixel electrode 1 in the pixel unit in the (M+1) row has a negative polarity, the data voltage applied to the data line D_L on the left side jumps from a positive polarity to a negative polarity, and the data voltage applied to the data line D_R on the right side jumps from a negative polarity to a positive polarity.

When the polarity of the data voltage loaded on the data line D_L on the left side is reversed (the polarity is changed from positive to negative), the voltage loaded on the pixel electrode 1 is pulled down by $\Delta Vp\_L$ through a coupling effect of the lateral capacitance between the data line D_L on the left side and the pixel electrode 1:

$$\Delta Vp\_L = Cpd\_L * \Delta Vd\_L / (Cpd\_L + Cpd\_R + Cst + Clc + Cgp),$$

where Cpd_L represents a lateral capacitance formed between the pixel electrode 1 and the data line D_L on the left side, Cpd_R represents a lateral capacitance formed between the pixel electrode 1 and the data line D_R on the right side, $\Delta Vd\_L$ represents a voltage variation amount (an absolute value of a difference between the data voltage after the polarity inversion and the data voltage before the polarity inversion) caused by the polarity inversion of the data voltage in the data line D_L on the left side, Cst represents a storage capacitance between the pixel electrode 1 and the common electrode, Clc represents a liquid crystal capacitance at the pixel unit, and Cgp represents a lateral capacitance between the pixel electrode 1 and the gate line.

When the polarity of the data voltage loaded on the data line D_R on the right side is inverted (the polarity is changed from negative to positive), the voltage loaded on the pixel electrode 1 is pulled up by $\Delta Vp\_R$ through a coupling effect of the lateral capacitance between the data line D_R on the right side and the pixel electrode 1:

$$\Delta Vp\_R = Cpd\_R * \Delta Vd\_R / (Cpd\_L + Cpd\_R + Cst + Clc + Cgp),$$

where $\Delta Vd\_R$ indicates a voltage variation amount (an absolute value of a difference between the data voltage after the polarity inversion and the data voltage before the polarity inversion) caused by the polarity inversion of the data voltage in the data line D_R on the right side.

For convenience of description, assuming $\Delta Vd\_L = \Delta Vd\_R$, after polarities of the data voltages in the left and right data lines are inverted, the voltage variation amount on the pixel electrode 1 is $|\Delta Vp\_L - \Delta Vp\_R|$, $|\Delta Vp\_L - \Delta Vp\_R| = |Cpd\_L - Cpd\_R| * \Delta Vd\_R / (Cpd\_L + Cpd\_R + Cst + Clc + Cgp)$.

Taking the pixel electrode 1 shown in FIG. 1 as an example, Cpd_L<Cpd_R, and thus the voltage on the pixel electrode 1 is pulled up by $(Cpd\_R - Cpd\_L) * \Delta Vd\_R / (Cpd\_L + Cpd\_R + Cst + Clc + Cgp)$. For the pixel units in the M row, the voltage with the positive polarity applied to the pixel units is increased in magnitude, and the display brightness is increased; for the pixel units in the (M+1) row, the voltage with negative polarity applied to the pixel units is reduced in magnitude, and the display brightness is reduced; a difference of brightness of the pixel units in such two adjacent rows is obvious, so that transverse mura is generated, and the greater the value of |Cpd_L−Cpd_R| is, the more obvious the difference of the brightness is.

In order to solve a technical problem that in the related art, in which due to the fact that the pixel electrode is provided with the hollow structure for accommodating the conductive bridge line, the difference between lateral capacitances respectively formed by the pixel electrode and the data lines on the left side and the right side is relatively large, and therefore the pixel units are obviously abnormal in a display process, embodiments of the present disclosure provides corresponding technical solutions.

Figure 5:
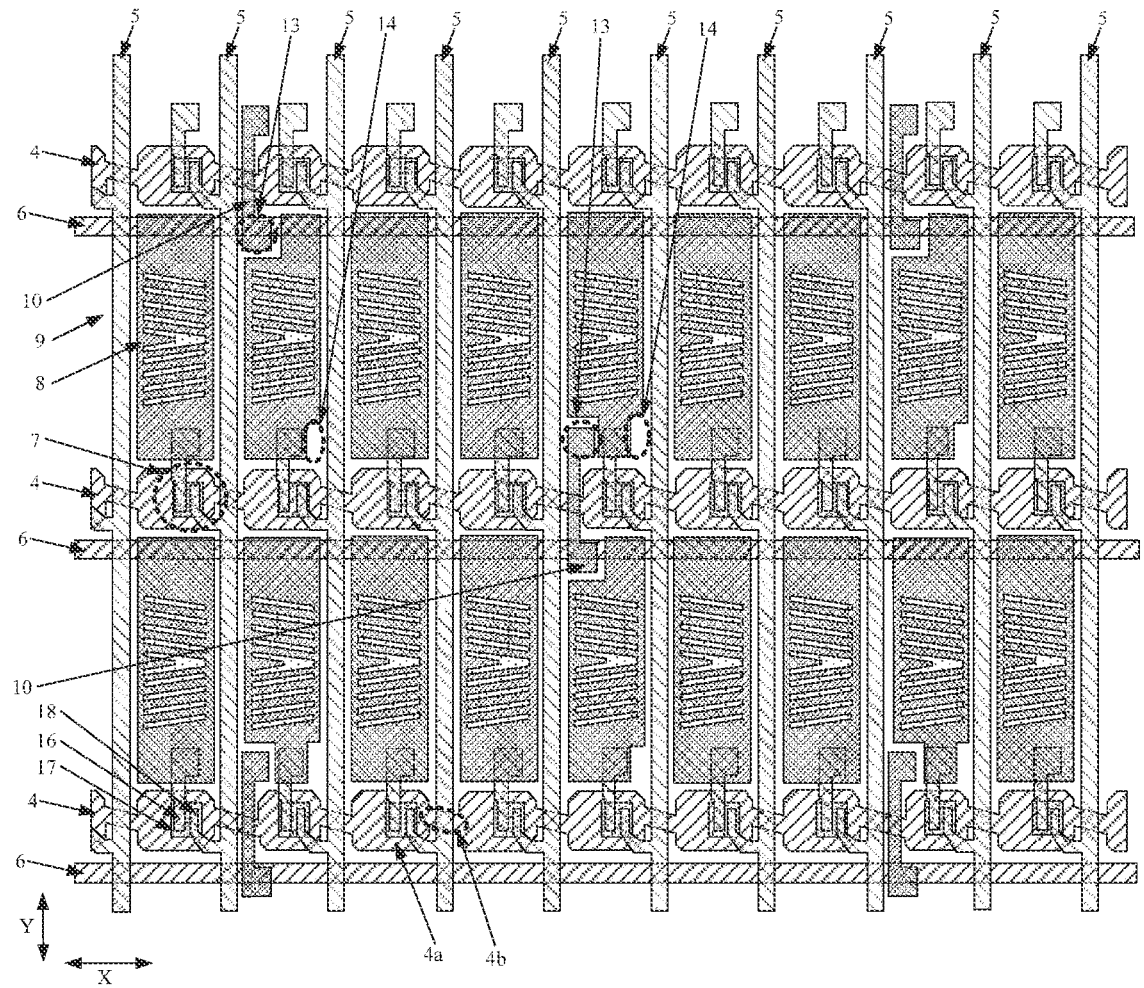
FIG. 5 is a schematic top view of a display substrate according to an embodiment of the present disclosure.
Figure 6A:
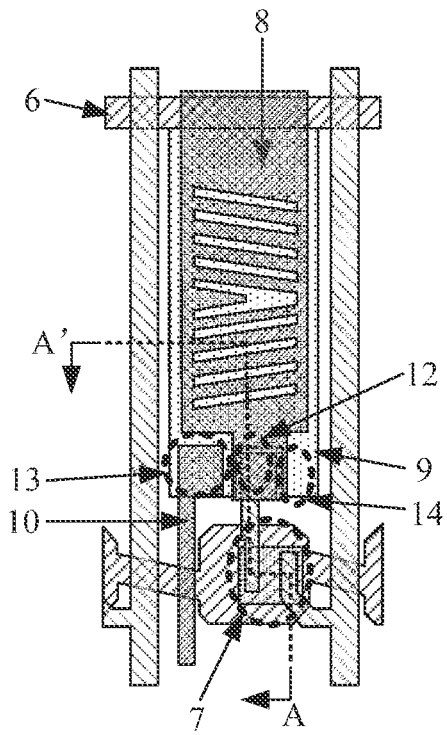
FIG. 6a is a top view of the pixel unit of FIG. 5 configured with a conductive bridge line.
Figure 6B:
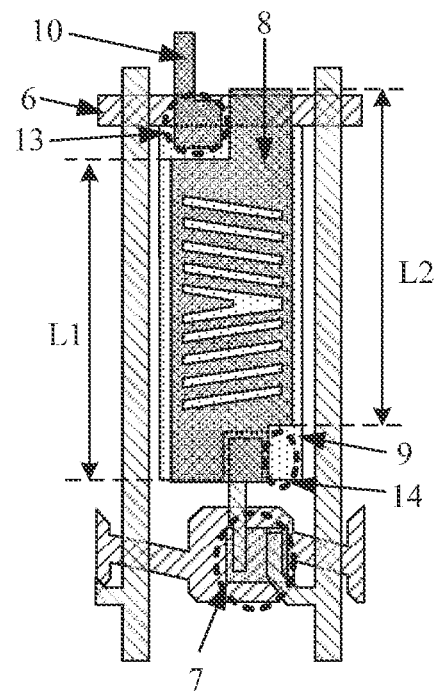
FIG. 6b is another top view of the pixel unit of FIG. 5 configured with a conductive bridge line.
Figure 7:
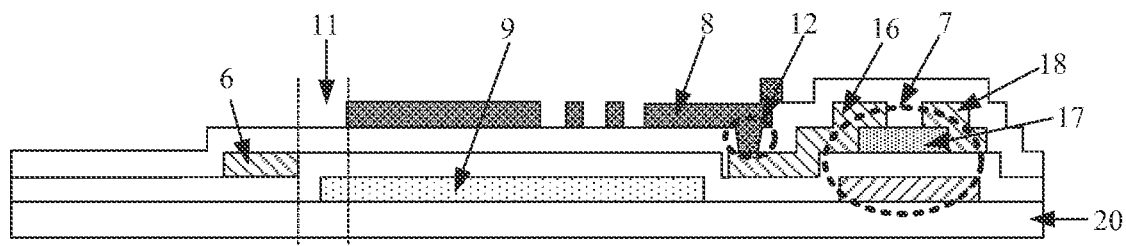

FIG. 5 is a schematic top view of a display substrate according to an embodiment of the present disclosure, FIG. 6a is a top view of the pixel unit configured with a conductive bridge line in FIG. 5, FIG. 6b is another top view of the pixel unit with a conductive bridge line in FIG. 5, FIG. 7 is a schematic cross-sectional view taken along line A-A' in FIG. 6a, as shown in FIGS. 5 to 7, the display substrate is an ADS type display substrate, and the display substrate includes: a first base substrate 20, and a plurality of gate lines 4 and a plurality of data lines 5 which are located on the first base substrate 20, where the gate lines 4 extend along a first direction X, the data lines 5 extend along a second direction Y, and the first direction X and the second direction Y are crossed and are parallel to a plane where the first base substrate 20 is located. In the embodiment of the present disclosure, a case where the first direction X is a row direction and the second direction Y is a column direction is taken as an example for an exemplary description.

The plurality of gate lines 4 and the plurality of data lines 5 define a plurality of pixel units, and each of the pixel units includes: a thin film transistor 7, a pixel electrode 8 and a common electrode 9, where the pixel electrode 8 is a slit electrode and is located on a side, away from the first base substrate 20, of the common electrode 9, an area where the pixel electrode 8 is located and an area where the thin film transistor 7 is located in a same one of the pixel units are arranged along the second direction Y, an end, proximal to the thin film transistor 7, of the pixel electrode 8 is a first end part, an end, away from the thin film transistor 7, of the pixel electrode 8 is a second end part, at least a portion of the pixel units are provided with a conductive bridge line 10, and the conductive bridge line 10 and the pixel electrode 8 are arranged in a same layer.

The thin film transistor 7 includes: a gate, a source 18, a drain 16 and an active layer 17. FIG. 5 only illustrates a case where the gate of the thin film transistor 7 in each pixel unit is coupled to the gate line 4 of a corresponding row, and the source 18 of the thin film transistor 7 in each pixel unit is coupled to the data line 5 on a right side of the thin film transistor 7 and closest to the thin film transistor 7, which is only an exemplary case and does not limit the technical solution of the present disclosure. The pixel units in the present disclosure may be arranged in other manners, for example, in a Z-inversion arrangement manner.

In addition, FIG. 5 only shows a case where there is one pixel unit configured with the conductive bridge line 10 in every three pixel units, and such case is only for exemplary purposes, and does not limit the technical solution of the present disclosure. In practical applications, the conductive bridge line 10 may be disposed in each pixel unit, or the conductive bridge line 10 may be disposed in a portion of the pixel units.

Referring to FIGS. 6a and 6b, in some implementations, in the pixel unit configured with the conductive bridge line 10, a first hollow structure 13 is disposed on a first side of the first end part or the second end part of the pixel electrode 8, an end of the conductive bridge line 10 is located in the first hollow structure 13 and is coupled to the common electrode 9 through a via hole, and a second hollow structure 14 is disposed on a second side of the first end part of the pixel electrode 8, so that an absolute value of a difference between lateral capacitances respectively formed by the pixel electrode 8 and the data lines 5 located at the left and right sides and closest to the pixel electrode 8 is less than or equal to a preset capacitance difference value; the first side and the second side are opposite sides of the pixel electrode 8 in the first direction X.

Taking the cases shown in FIGS. 5, 6a, and 6b as examples, in any pixel unit, the thin film transistor 7 is located below the pixel electrode 8 corresponding thereto, the first end part of the pixel electrode 8 refers to a lower end part of the pixel electrode 8, and the second end part of the pixel electrode 8 refers to an upper end part of the pixel electrode 8; the first side is specifically the left side, and the second side is specifically the right side.

FIG. 6a illustrates a case where the first hollow structure 13 is disposed at the first end part of the pixel electrode 8 (the first hollow structure 13 is located at a lower left corner of the pixel electrode 8), and FIG. 6b illustrates a case where the first hollow structure 13 is disposed at the second end part of the pixel electrode 8 (the first hollow structure 13 is located at an upper left corner of the pixel electrode 8). In FIGS. 6a and 6b, the second hollow structure 14 is located at the right side of the lower end part of the pixel electrode 8. It should be noted that, the cases shown in FIG. 6a and FIG. 6b are used for exemplary purposes, and do not limit the technical solution of the present disclosure.

In some implementations, the second hollow structure 14 and the first hollow structure 13 have a same length in the second direction Y. With such a design, it is beneficial to realize that the lateral capacitances formed by the pixel electrode 8 and the data line 5 located at the left and right sides and closest to the pixel electrode 8 are equal or approximately equal.

In general, a portion of the pixel electrode 8 that is less than 6 μm away from the data line 5 in the horizontal direction can form a lateral capacitance with the data line 5. For convenience of description, a portion of the pixel electrode 8 capable of forming a lateral capacitance with the data line 5 on the left side in FIGS. 6a and 6b is referred to as a first portion, and a portion of the pixel electrode 8 capable of forming a lateral capacitance with the data line 5 on the right side in FIGS. 6a and 6b is referred to as a second portion.

In the embodiment of the present disclosure, the second hollow structure 14 is disposed in the pixel electrode 8 having the first hollow structure 13, and the length of the second hollow structure 14 in the second direction Y is equal to or similar to that of the first hollow structure 13 in the second direction Y, so that the length L1 of the first portion of the pixel electrode 8 in the second direction Y and the length L2 of the second portion of the pixel electrode 8 in the second direction Y are equal to or similar to each other, and thus the lateral capacitance Cpd_L formed between the first portion of the pixel electrode 8 and the data line 5 on the left side, and the lateral capacitance Cpd_R formed between the second portion of the pixel electrode 8 and the data line 5 on the right side satisfy a condition that |Cpd_L−Cpd_R| is less than or equal to the preset capacitance difference value, and thereby effectively reducing or even eliminating the influence on the voltage loaded on the pixel electrode 8 when the polarities of the data voltages in the data lines 5 on the left and right sides of the pixel electrode 8 are simultaneously reversed, which is beneficial to reducing and even eliminating mura.

Considering that if the length of the second hollow structure 14 in the second direction Y is too long, an aperture ratio of the pixel will be influenced; therefore, in some implementations, the length of the second hollow structure 14 in the second direction Y may be not greater than the length of the first hollow structure in the second direction Y when |Cpd_L−Cpd_R| is less than or equal to the preset capacitance difference value.

In some implementations, the preset capacitance difference value is less than or equal to 1.0 fF. When the lateral capacitances respectively formed by the pixel electrode 8 and the data lines 5 located at the left and right sides and closest to the pixel electrode 8 are equal, that is, Cpd_L=Cpd_R, the influence of the polarity inversion of the data voltages in the data lines 5 located at the left and right sides of the pixel electrode 8 on the voltage loaded on the pixel electrode 8 can be effectively eliminated, so that mura can be effectively eliminated.

In practical applications, it is found that a portion of the pixel electrode 8 that is more than 6 μm away from the data line 5 in the first direction X does not generate a significant lateral capacitance because it is relatively far away from the data line 5. In addition, the length of the second hollow structure 14 in the first direction X is also not too large, because the larger the length of the second hollow structure 14 in the first direction X is, the smaller the overall size of the pixel electrode 8 is, the smaller the storage capacitance formed between the pixel electrode 8 and the common electrode 9 is, and the capability of the pixel electrode 8 to maintain the gray scale voltage is weakened. In consideration of the above factors, in the embodiment of the present disclosure, the length of the second hollow structure 14 in the first direction X is greater than or equal to 6 μm and less than or equal to the length of the first hollow structure 13 in the first direction X.

Referring to FIGS. 6a, 6b and 7, in some implementations, in the pixel unit configured with the conductive bridge line 10, the pixel electrode 8 has a first orthographic projection on the first base substrate 20, the data lines 5 located at two sides (i.e., the left and right sides) of the pixel electrode 8 and closest to the pixel electrode 8 have a second orthographic projection on the first base substrate 20, and a spacing area 11 is formed between the first orthographic projection and the second orthographic projection; in the pixel unit configured with the conductive bridge line 10, the common electrode 9 is a block-shaped common electrode 9, and an orthographic projection of an edge of the block-shaped common electrode 9 proximal to the data line 5 on the first base substrate 20 is located in the spacing area 7.

Referring to FIG. 7, in the pixel unit configured with the conductive bridge line 10, taking a left edge of the common electrode 9 as an example, in the first direction X, the left edge of the common electrode 9 is located between a left edge of the pixel electrode 8 and the data line 5 on the left side, and an electric field formed between the left edge of the common electrode 9 and the data line 5 on the left side plays a certain role in shielding an electric field formed between the left edge of the pixel electrode 8 and the data line 5 on the left side, so that an intensity of the electric field formed between the left edge of the pixel electrode 8 and the data line 5 on the left side is reduced; since the lateral capacitance is related to the intensity of the electric field, the smaller the intensity of the electric field is, the smaller the lateral capacitance is, and the lateral capacitance between the pixel electrode 8 and the data line 5 on the left side can be reduced by the above design. Similarly, when a right edge of the common electrode 9 is located between a right edge of the pixel electrode 8 and the data line 5 on the right side, the lateral capacitance between the pixel electrode 8 and the data line 5 on the right side can also be reduced.

In the embodiment of the present disclosure, both the lateral capacitances respectively formed by the pixel electrode 8 and the data lines 5 located at two sides of the pixel electrode 8 and closest to the pixel electrode 8 are reduced through the above design, which is beneficial to reducing the influence on the voltage loaded on the pixel electrode 8 when the polarities of the data voltages in the data lines 5 at two sides of the pixel electrode 8 are reversed.

In some implementations, the display substrate further includes common electrode lines 6, the common electrode lines 6 are disposed in a same layer as the gate lines 4, the pixel units arranged along the first direction X correspond to a same one of the common electrode lines 6, the common electrode 9 in each of the pixel units is electrically coupled to a corresponding one of the common electrode lines 6, and an orthographic projection of the second end part of the pixel electrode 8 on the first base substrate 20 overlaps an orthographic projection of the corresponding one of the common electrode lines 6 on the first base substrate 20.

It should be noted that, in the present disclosure, two structures being arranged in a same layer means that the two structures are obtained based on a patterning process on a same material film, and distances between the two structures and the base substrate may be equal or different.

With continued reference to FIG. 5, in some implementations, the gate line 4 includes first conductive patterns 4a and second conductive patterns 4b alternately arranged along the first direction X, a length of the first conductive pattern 4a in the second direction Y being greater than a length of the second conductive pattern 4b in the second direction Y; an orthographic projection of the first conductive pattern 4a on the first base substrate 20 is not overlapped with the orthographic projection of the data line 5 on the first base substrate 20, and a part of the first conductive pattern 4a is used as the gate in the thin film transistor 7; an orthographic projection of the conductive bridge line 10 on the first base substrate 20 does not overlap with the orthographic projection of the first conductive pattern 4a on the first base substrate 20.

In the embodiment of the present disclosure, the length of the first conductive pattern 4a in the second direction Y is relatively large, which can effectively reduce an overall resistance of the gate line 4, and is beneficial to loading and transmitting signals. Meanwhile, the length of the second conductive pattern 4b in the second direction Y is relatively small, and an area of the second conductive pattern 4b opposite to the data line 5 and the conductive bridge line 10 is relatively small, so that a parasitic capacitance formed therebetween is relatively small, and a signal crosstalk between the gate line 4 and the data line 5 as well as the conductive bridge line 10 can be effectively reduced.

Figure 8:
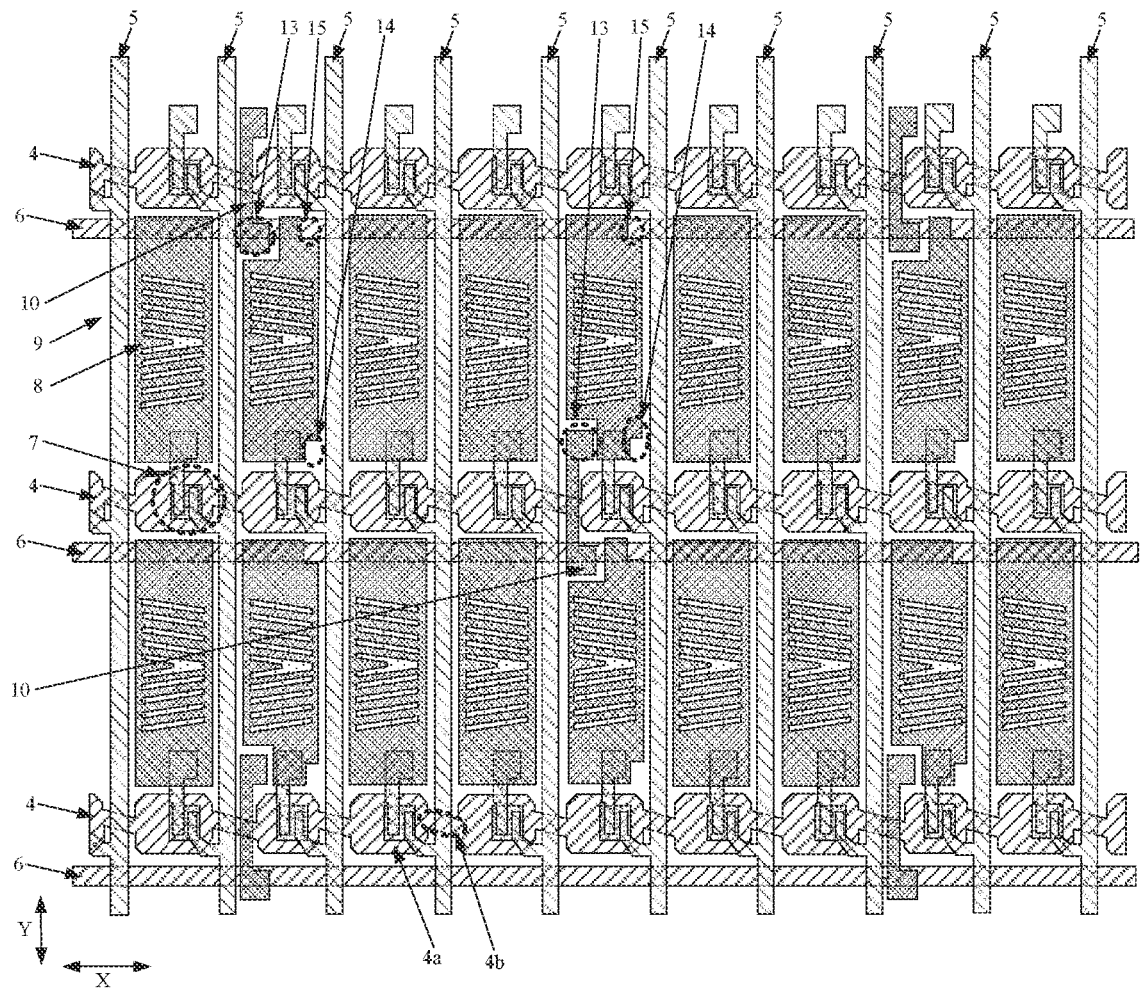
FIG. 8 is another schematic top view of a display substrate according to an embodiment of the present disclosure.
Figure 9A:
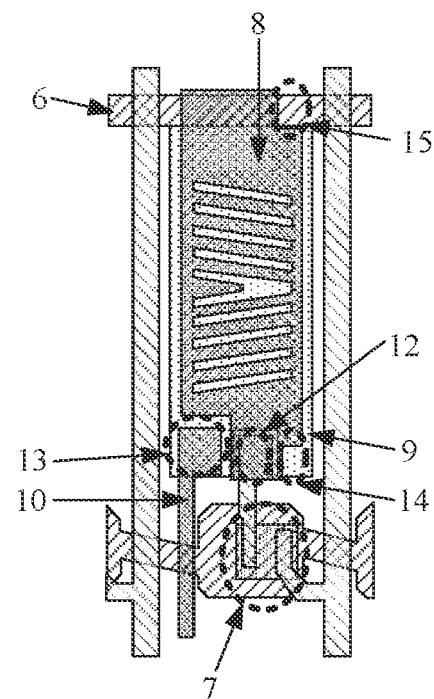
FIG. 9a is a top view of the pixel unit of FIG. 8 configured with a conductive bridge line.
Figure 9B:
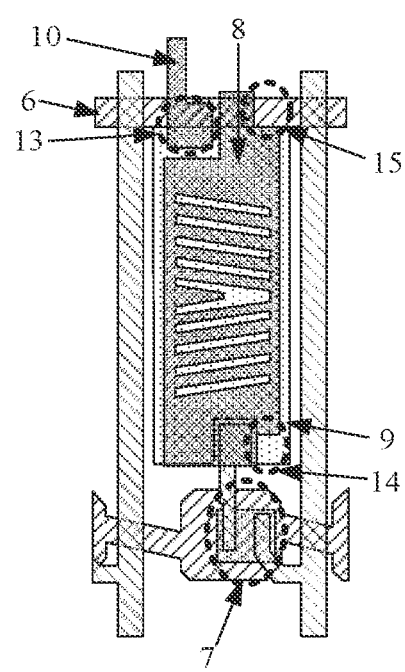
FIG. 9b is another top view of the pixel unit of FIG. 8 configured with a conductive bridge line.

FIG. 8 is another schematic top view of a display substrate according to an embodiment of the preset disclosure, FIG. 9a is a top view of the pixel unit configured with a conductive bridge line in FIG. 8, and FIG. 9b is another top view of the pixel unit configured with a conductive bridge line in FIG. 8, as shown in FIGS. 8 to 9b, in the embodiment, in the pixel unit configured with the conductive bridge line 10, not only the second hollow structure 14 is provided on the second side of the first end part of the pixel electrode 8, but also a third hollow structure 15 is provided on the second side of the second end part of the pixel electrode 8; the second hollow structure 14 and the third hollow structure 15 are configured such that an absolute value of a difference between lateral capacitances respectively formed by the pixel electrode 8 and the data lines 5 located at two sides of the pixel electrode and closest to the pixel electrode 8 is less than or equal to a preset capacitance difference value.

Compared with the length of the second hollow structure 14 in the second direction Y in FIGS. 5, 6a, and 6b, the lengths of the second hollow structure 14 and the third hollow structure 15 in the second direction Y in the embodiment are shorter. Usually, an upper right corner region and a lower right corner region of the pixel electrode 8 are covered by a black matrix of an opposite substrate, and if the length of the second hollow structure 14 in the second direction Y is too long, which causes that the second hollow structure 14 cannot be covered by the existing black matrix, a coverage area of the black matrix needs to be increased, thereby reducing the aperture ratio of the pixel unit. In the embodiment, by providing the third hollow structure 15, the length of the second hollow structure 14 in the second direction Y can be reduced, and when the lengths of the second hollow structure 14 and the third hollow structure 15 in the second direction Y are both short, the second hollow structure 14 and the third hollow structure 15 are both located in an area covered by the existing black matrix, so that the aperture ratio of the pixel unit is not affected.

It should be noted that, in the embodiment of the present disclosure, the length of the second hollow structure 14 in the second direction Y and the length of the third hollow structure 15 in the second direction Y can be set and adjusted according to actual needs.

In some implementations, a sum of the lengths of the second hollow structure 14 and the third hollow structure 15 in the second direction Y is equal to the length of the first hollow structure in the second direction Y. With such a design, it is beneficial to realize that the lateral capacitances respectively formed by the pixel electrode 8 and the data line 5 located at two sides of the pixel electrode 8 and closest to the pixel electrode 8 are equal or approximately equal.

In some implementations, the length of the third hollow structure 15 in the first direction X is greater than or equal to 6 μm and less than or equal to the length of the first hollow structure 13 in the first direction X.

In some implementations, the common electrode 9 directly overlaps the common electrode line 6. Since the orthographic projection of the second end part of the pixel electrode 8 on the first base substrate 20 overlaps the orthographic projection of the common electrode line 6 on the first base substrate 20, the third hollow structure 15 arranged at the second end part of the pixel electrode 8 overlaps the common electrode line 6. Since the area where the common electrode line 6 is located is covered by the black matrix, the arrangement of the third hollow structure 15 does not substantially affect the aperture ratio of the pixel unit. In some implementations, the orthographic projection of the third hollow structure 15 on the first base substrate 20 is located in an area defined by the orthographic projection of the common electrode line 6 on the first base substrate 20, and in such case, the arrangement of the third hollow structure 15 does not affect the aperture ratio of the pixel unit.

Referring to FIGS. 6a and 9a, in some implementations, the drain of the thin film transistor 7 is coupled to the pixel electrode 8 through a via hole 12, and when the first hollow structure 13 is located on the first side of the first end part of the pixel electrode 8, the via hole 12 for coupling the drain of the thin film transistor 7 to the pixel electrode 8 is located between the first hollow structure 13 and the second hollow structure 14.

An embodiment of the present disclosure further provides a display panel, including: a display substrate and an opposite substrate which are oppositely arranged, a liquid crystal layer is filled between the display substrate and the opposite substrate, the display substrate is that described in the above embodiment, and for the description of the display substrate, reference may be made to the contents in the foregoing embodiment, and details are not repeated here.

In some implementations, the opposite substrate is a color filter substrate, and the color filter substrate includes: a second base substrate, a black matrix and a color filter pattern which are positioned on the second base substrate; the black matrix defines a plurality of light outlets of pixels (the shapes of the light outlets of the pixels can be designed according to actual needs), the light outlets of the pixels correspond to the pixel units one by one, so as to define light outlet areas of the pixel units, and the color filter pattern is positioned in the light outlets of the pixels; an orthographic projection of the black matrix on the first base substrate completely covers orthographic projections of the gate lines, the data lines, the thin film transistors, the first hollow structures and the second hollow structures on the first base substrate. When the display substrate is further provided with the third hollow structures, the orthographic projection of the black matrix on the first base substrate further covers the orthographic projection of the third hollow structures on the first base substrate.

An embodiment of the present disclosure further provides a display device, where the display device includes a display panel and a light source, the display panel is the display panel in the foregoing embodiment, and for the description of the display panel, reference may be made to the contents in the foregoing embodiment, and details are not repeated here.

The display device provided by the embodiment of the present disclosure may be any product or component having a display function, such as a liquid crystal display device, electronic paper, a mobile phone, a tablet computer, a television, a display, a notebook computer, a digital photo frame, and a navigator.

It will be understood that the above embodiments are merely exemplary embodiments adopted to illustrate the principles of the present disclosure, and the present disclosure is not limited thereto. It will be apparent to those skilled in the art that various modifications and improvements can be made without departing from the spirit and scope of the present disclosure, and such modifications and improvements are also considered to be within the scope of the present disclosure.

The invention claimed is:

1. A display substrate, comprising: a first base substrate, and a plurality of gate lines and a plurality of data lines which are positioned on the first base substrate, wherein the gate lines extend along a first direction, the data lines extend along a second direction, and the first direction and the second direction are crossed and are parallel to a plane where the first base substrate is positioned;

the plurality of gate lines and the plurality of data lines define a plurality of pixel units, and each of the pixel units comprises a thin film transistor, a pixel electrode and a common electrode, the pixel electrode is positioned on a side of the common electrode away from the first base substrate, an area where the pixel electrode is positioned and an area where the thin film transistor is positioned in a same one of the pixel units are arranged along the second direction, an end, proximal to the thin film transistor, of the pixel electrode is a first end part, an end, away from the thin film transistor, of the pixel electrode is a second end part, at least a portion of the pixel units are provided with a conductive bridge line, and the conductive bridge line and the pixel electrode are arranged in a same layer;

in the pixel unit configured with the conductive bridge line, the pixel electrode has a first notch on a first side of the first end part or the second end part of the pixel electrode, an end of the conductive bridge line is located in the first notch and is coupled to the common electrode through a via hole, and the pixel electrode has a second notch on a second side of at least one of the first end part or the second end part of the pixel electrode, so that lengths of a first portion and a second portion of the pixel electrode, that generate lateral capacitances respectively with the data lines located on two sides of the pixel electrode and closest to the pixel electrode, in the second direction, are substantially equal to each other, and an absolute value of a difference between the lateral capacitances respectively formed between the pixel electrode and the data lines which are located on the two sides of the pixel electrode and are closest to the pixel electrode is less than or equal to a preset capacitance difference value;

the first side and the second side are opposite sides of the pixel electrode in the first direction.

2. The display substrate according to claim 1, wherein the second notch and the first notch have a same length in the second direction.

3. The display substrate according to claim 1, wherein the second notch comprises a first sub-notch at the second side of the first end part of the pixel electrode and a second sub-notch at the second side of the second end part of the pixel electrode, and the first sub notch and the second sub notch are configured such that the lengths of the first portion and the second portion of the pixel electrode, that generate the lateral capacitances respectively with the data lines located on the two sides of the pixel electrode and closest to the pixel electrode, in the second direction, are substantially equal to each other, and the absolute value of the difference between the lateral capacitances respectively formed between the pixel electrode and the data lines located at the two sides of the pixel electrode and closest to the pixel electrode is less than or equal to the preset capacitance difference value.

4. The display substrate according to claim 3, wherein a sum of lengths of the first sub notch and the second sub notch in the second direction is equal to a length of the first notch in the second direction.

5. The display substrate according to claim 3, wherein a length of each of the first sub-notch and the second sub-notch in the first direction is less than or equal to a length of the first notch in the first direction.

6. The display substrate according to claim 1, wherein a length of the second notch in the first direction is less than or equal to a length of the first notch in the first direction.

7. The display substrate according to claim 1, wherein the lateral capacitances respectively formed between the pixel electrode and the data lines located at the two sides of the pixel electrode and closest to the pixel electrode are equal to each other.

8. The display substrate according to claim 1, wherein, in the pixel unit configured with the conductive bridge line, the pixel electrode has a first orthographic projection on the first base substrate, the data lines located at two sides of the pixel electrode and closest to the pixel electrode has a second orthographic projection on the first base substrate, and a spacing area is formed between the first orthographic projection and the second orthographic projection;

in the pixel unit configured with the conductive bridge line, the common electrode is a block-shaped common electrode, and an orthographic projection of an edge of the block-shaped common electrode proximal to the data line on the first base substrate is located in the spacing area.

9. The display substrate according to claim 1, further comprising common electrode lines which are arranged in the same layer as the gate lines;

the pixel units arranged along the first direction correspond to a same one of the common electrode lines, the common electrode in each of the pixel units is electrically coupled to a corresponding one of the common electrode lines, and an orthographic projection of the second end part of the pixel electrode in each of the pixel units on the first base substrate is overlapped with an orthographic projection of the corresponding one of the common electrode lines on the first base substrate.

10. The display substrate according to claim 1, wherein a drain of the thin film transistor is coupled to the pixel electrode through a via hole;

in response to that the first notch is located on the first side of the first end part of the pixel electrode, the via hole for coupling the drain of the thin film transistor with the pixel electrode is located between the first notch and the second hollow notch.

11. A display panel, comprising: a display substrate and a opposite substrate which are oppositely arranged, wherein a liquid crystal layer is filled between the display substrate and the opposite substrate, and the display substrate is that according to claim 1.

12. A display device, comprising the display panel according to claim 11 and a light source.

* * * * *